United States Patent Office 3,433,673
Patented Mar. 18, 1969

3,433,673
BATTERY ELECTRODE HAVING THIN DEPOSIT
OF META-DINITROBENZENE ON GRAPHITE
FABRIC AND A METHOD FOR MAKING IT
Joseph C. Duddy, Trevose, Pa., assignor to ESB
Incorporated, a corporation of Delaware
No Drawing. Filed Aug. 29, 1967, Ser. No. 663,974
U.S. Cl. 136—22                                4 Claims
Int. Cl. H01m 13/02, 13/04

ABSTRACT OF THE DISCLOSURE

A solution containing meta-dinitrobenzene (MDB) is applied to a graphite fabric. The solvent is then removed, leaving a thin MDB deposit on the fabric. The resultant product may be used as a battery electrode.

Cross-references to related applications

This application is related to the following others:
(1) "Graphite Fabric Electrode or Grid," Ser. No. 663,969, Joseph C. Duddy;
(2) "Electrochemical Cell Having a Graphite Fabric Electrode," Ser. No. 663,970, Joseph C. Duddy;
(3) "Method of Making Battery Electrodes Using Molten Meta-Dinitrobenzene," Ser. No. 663,971, Joseph C. Duddy; and
(4) "Method of Making a Battery Electrode Containing Meta-Dinitrobenzene and a Metallic Halide," Ser. No. 663,962, Duddy et al.

All five applications have common filing dates and common ownership.

Background of the invention

The organic compound meta-dinitrobenzene (MDB) is attractive as a depolarizer for a battery electrode due to its high theoretical capacity and compartive low cost.

Prior methods of constructing electrodes having thick MDB deposits have involved pressing a mixture of MDB and a conductor onto a metallic grid. The high pressures and large equipment which were required for those purposes were unsuited for applying thin MDB deposits to the grid. The low surface area of the metallic grids was contrary to the desire to spread the MDB over a large surface area.

Summary of the invention

With this invention a solution containing MDB is applied to a graphite fabric and the solvent removed, leaving a thin MDB deposit on the fabric. The resulting product is a highly desirable battery electrode having a high theoretical capacity, low cost depolarizer material deposited on a high surface area, highly conductive fabric or grid.

Description of the preferred embodiment

The organic compound meta-dinitrobenzene (MDB) is attractive for use as a battery electrode depolarizer due to its high theoretical capacity (114.8 ampere minutes per gram) and comparative low cost. Advantage may be obtained from this desirable material, however, by applying it in thin deposits to a grid having a large surface area; in this manner the large surface area is developed in a given weight of MDB and the MDB is able to react most quickly and most completely.

In recent years processes have been developed by which fabric or cloth made from rayon may be converted into graphite. Such graphite fabric seems well suited for use as grids in battery electrodes because of several desired properties which they possess. (The first of the four cross-referenced related applications claims this material as an electrode or grid on which other substances may be deposited. The second application claims an electrochemical cell containing the electrode or grid.) The total surface area of the many filaments is much greater, and there is therefore a much larger surface area, than is the case with counterpart porous carbon or metallic grid. The material from which these fabric grids would be made, graphite, is a very good electrical conductor, and this is highly desirable. The microscopic porosity which exists between the filaments in each yarn of fabric, together with the macro-porosity existing between the interwoven yarns, provide a highly porous material through which electrolyte may pass to make contact with the large surface area of the fabric. Potentially the graphite fabric grids are much less expensive than their carbon or metallic counterparts, and they have the further advantage of being flexible and are therefore susceptible to being wrapped in many configurations. These are among the reasons why the graphite fabrics seem attractive for use as a grid in a battery electrode.

For the desirable MDB to be used effectively with the desirable graphite fabric, it is necessary to apply a thin deposit of the MDB on as much of the total surface area of the fabric as possible. To achieve such a result requires that the MDB be able to travel in the micropores existing between filaments.

According to the process invention of this application, a thin deposit of MDB is deposited over the surface area of the graphite fabric by dissolving MDB in any suitable solvent, applying the solution to the graphite fabric, and removing the solvent. Any solvent for MDB may be used, such as toluene, benzene, ether, or chloroform; toluene and benzene are the preferred solvents. The MDB solution may be saturated and may be used at room temperature. The solution may be applied to the fabric by dipping the fabric in the solution.

This method avoids the machinery which is required to apply thick deposits of MDB onto a metallic grid, and has the additional advantage of producing an MDB deposit which requires no conductive additive.

To illustrate the utility of an electrode made according to this process, when a graphite fabric (manufactured by Union Carbide and sold under the trademark "Graphite Cloth Grade WCB") containing a thin deposit of MDB was discharged in seawater against a magnesium anode using a filter grade glass fiber separator at a rate of 14 ma./sq. in. the initial voltage was 1.03 volts and at the end of 100 minutes the voltage was 1.00 volt. At a current drain of 25 ma./sq. in., the initial voltage was 1.02 volts and at the end of 60 minutes the voltage was 0.80 volt.

The last two cross-referenced related applications listed above are also concerned with methods of obtaining MDB deposits.

What is claimed is:
1. A method for making a battery electrode consisting of applying a solution containing dissolved meta-dinitrobenzene to a graphite fabric and subsequently removing the solvent.
2. The method of claim 1 in which a solution consisting of meta-dinitrobenzene dissolved in toluene is applied.
3. The method of claim 1 in which a solution consisting of meta-dinitrobenzene dissolved in benzene is applied.
4. A battery electrode consisting of a deposit of meta-dinitrobenzene on a graphite fabric.

References Cited

UNITED STATES PATENTS

| | | | |
|---|---|---|---|
| 2,855,452 | 10/1958 | Morehouse et al. | 136—120 |
| 3,025,336 | 3/1962 | Bartosh et al. | |
| 3,060,255 | 10/1962 | Lozier | 136—137 |

WINSTON A. DOUGLAS, *Primary Examiner.*

C. F. LE FEVOUR, *Assistant Examiner.*

U.S. Cl. X.R.

136—20, 120, 137